Patented May 12, 1931

1,805,458

UNITED STATES PATENT OFFICE

THOMAS HUNTON ROGERS, OF WILMINGTON, DELAWARE, ASSIGNOR TO E. I. DU PONT DE NEMOURS & CO., OF WILMINGTON, DELAWARE, A CORPORATION OF DELAWARE

OIL COMPOSITION AND PROCESS OF INHIBITING OXIDATION THEREOF

No Drawing. Application filed August 21, 1922, Serial No. 583,364. Renewed March 5, 1927.

This invention relates to compositions at least one constituent of which is an organic material, for instance, a liquid such as an unsaturated fatty oil, which has a tendency to undergo a chemical change at ordinary room temperature (20° C.) when exposed to air and to actinic light; and of which another constituent is an hydroxy-polybasic aliphatic acid, or a salt or ester thereof, functioning to prevent or inhibit said chemical change of the first mentioned constituent. My invention also includes the process of inhibiting the oxidation in the presence of air of an organic material of the kind above-mentioned by dispersing, at least throughout the surface portion of said material, an hydroxy-polybasic aliphatic acid, or a salt, ester or other active derivative of such acid.

An important aspect of my invention pertains to the retarding of the development of rancidity of oils which tend to become rancid when exposed to air, and one of the chief objects of my invention, from this aspect, is to improve upon nitrocellulose "dope" compositions for use in coating of fabrics, paper, split leathers, and in general for leather substitute uses.

It has been customary for many years to use vegetable oils as softeners for pyroxylin compositions. For example, castor oil is very generally used in the surface film of artificial leather, and either castor oil or blown rapeseed oil is used in most of the dope applied to split leather. It is noteworthy that the oils used for this purpose belong for the most part in the class of unsaturated glycerides.

It is well known that unsaturated fatty oils, as, for example, castor oil, upon exposure to air, develop a rancid odor and taste which is quite objectionable. This rancidity development is especially marked where the oil is a constitutent of a coating composition, for in this case, as a result of the extensive surface exposed to the air, the action of oxygen on the oil is facilitated.

The addition of various substances to oils for the purpose of preventing the development of rancidity therein was proposed many years ago; these substances comprised (a) halides, such as zinc chloride, (b) salts of aromatic acids, for example sodium salicylate, (c) phenolates, such as sodium sulphocarbolate, and (d) naphthol. My experiments indicate that the preventive action of most of the above compounds is feeble; it is most pronounced in the case of betanaphthol, which, however, is hardly effective at all in preventing rancidity when the composition containing the oil is exposed to sunlight in the presence of air.

I have now discovered that mono-hydroxy- and poly-hydroxy-polybasic aliphatic acids and certain of their derivatives, such as citric, malic, and tartaric acids, their sodium and potassium salts, and their lower-alkyl esters, are effective in retarding the development of rancidity in unsaturated vegetable oils. Since the aliphatic carboxylic acids may be referred to as hydrogen carboxylates (for example hydrogen citrate, hydrogen tartrate, etc.), I mean to include the free acids as well as the salts and esters of said acids when using the terms carboxylates, citrates, tartrates, etc., in a generic sense.

The addition of even as small a quantity of one of the above substances as one part to one thousand parts of oil effects a marked decrease in the rate of rancidity development under conditions which are normally favorable to such a change.

The above discovery is particularly useful in preserving the freshness of the oil in coating compositions, where, for example, nitrocellulose, an oil, generally castor oil, and the rancidity-retarder are incorporated by means of a suitable volatile solvent and spread on a cloth backing. Upon aging, fabrics coated with the ordinary pyroxylin-oil composition often become sticky and finally brittle indicating deterioration of the coating composition. It has been found that these aliphatic substances containing one or more hydroxyl groups and at least two carboxyl groups not only prevent rancidity development, but also greatly retard the deterioration to which such goods are liable. The rancidity-retarders thus are of great value in preserving the original pliable quality of the film.

The tests of the effects of the new rancidity-retarders have been made in the following manner: To 100 parts of a nitrocellulose solution obtained by dissolving 16 ounces of nitrocellulose in one gallon of a mixture of ethyl acetate, benzol and ethyl alcohol, are added 25 parts of castor oil, and 0.185 parts of the retarder, dissolved in alcohol. After spreading the resulting jelly and allowing the solvent to evaporate, the film obtained is placed in a bottle, which is kept in an oven maintained at 65° C. The time necessary for the development of rancidity is then determined by observing the odor in the bottle every day. This test is used because rancidity development is accelerated at the elevated temperature and can be unmistakably noted as soon as it develops. It has been found that results of exposure under ordinary conditions, provided direct sunlight is excluded, parallel the (accelerated) test results. The following tables show the effect of various added substances:

*Clear films—65° C. Storage*

|  | Per cent retarder based on oil | Rancid (days) |
|---|---|---|
| Control | 0.00 | 1 |
| Tartaric acid | 1.00 | 19 |
| Citric acid | 0.75 | 11 |
| Malic acid | 0.75 | 12 |
| NaK tartrate | 0.75 | 15 |
| NaH mucate | 0.75 | 3 |
| Ammonium citrate | 0.5 | 7 |
| Citric acid | 0.5 | 7 |
| Sodium citrate | 0.5 | 10 |
| Potassium tartrate | 0.75 | 12 |
| Diethyl tartrate | 0.75 | 3 |
| Monobenzyl tartrate | 0.75 | 6 |

*White films—65° C. Storage*

|  | Per cent retarder based on oil | Rancid (days) | Brittle |
|---|---|---|---|
| Control | 0.00 | 1 | 20 da. |
| Tartaric acid | 1 | 5 | 3 mos.[1] |
| Tartaric acid | 2 | 26 | 3 mos. |
| Dibutyl tartrate | 0.75 | 3 | Approx. 30 da. |
| Dibutyl tartrate | 2 | 3 | Approx. 30 da. |
| Potassium tartrate | 2 | 12 | 50 da.[1] |

[1] Indicates that films are not brittle after time indicated.

In general it has always been found that materials which retard rancidity also retard the development of stickiness and brittleness. The tests for brittleness given above is the length of time required for the films stored at 65° C. to become so stiff that they will crack upon a single fold.

The white films contain zinc oxide as the pigment and their preparation is as follows: The pigment is thoroughly ground in an equal weight of oil; to 100 parts of 16-oz. nitrocellulose jelly is added 15 parts of this pigment and oil mixture and 18 parts of castor oil. The various inhibitors are incorporated by making an alcoholic solution and adding this while mixing up the jelly.

The hydroxy-polybasic acids and their salts and esters which I have found to be useful in preventing development of rancidity in unsaturated fatty oils, may be described generically as hydroxy-polybasic aliphatic acid compounds whose molecular structure is in part as follows:—

where R comprises at least one carbon atom, and preferably from 2 to 4 carbon atoms, $m$ represents a whole number, and $n$ represents a whole number greater than one.

The class of compounds of this kind which I have found to be most effective may be described as having the following graphical formula:—

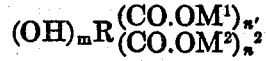

where R comprises at least one carbon atom, and preferably from 2 to 4 carbon atoms, $M^1$ represents a positive inorganic radical such as hydrogen or a metal, $M^2$ represents a positive inorganic radical such as hydrogen or a metal, and $m$, $n'$ and $n^2$ stand for whole numbers. I use the expression "positive inorganic radical" to include ammonium as well as the radicals of hydrogen and metals.

Although in the above tables I have mentioned specifically certain acids, salts, and esters, it will be understood that my invention is not limited to compositions containing these particular substances, but includes compositions containing as oxidation-inhibitors various other substances falling within the genus defined above.

The efficacy of the various substances which make up the above defined genus in functioning as oxidation-inhibitors depends largely upon the extensiveness of the surface of such substance which is in contact with the material to be conserved; that is, upon the extent to which intimate contact is attained between the inhibitor and said material. Intimate contact is most perfectly and conveniently attained when the inhibitor is soluble either in the unsaturated fatty oil which is to be conserved or in a liquid which is also a solvent for said oil. Where the inhibitor is not appreciably soluble in the oil, and where no suitable mutual solvent is available, it becomes necessary to disseminate the oxidation-inhibitor throughout the oil as thoroughly as possible, preferably by various known methods for effecting a high degree of dispersion. For the above reasons there is in many cases an advantage in using the alkali-metal salts of hydroxy-polybasic aliphatic acids rather than the more insoluble salts (such as the alkaline earth metal salts) or than the free acids. The neutral esters, as indicated in the above tables, have been found to be less efficacious than either the free acid or the metal salts, despite the fact that such esters are in some cases quite soluble in the oil.

I claim:

1. The process of retarding the development of rancidity in unsaturated fatty oils which comprises mixing with such an oil an hydroxy-polybasic aliphatic carboxylate.

2. The process of retarding the development of rancidity in unsaturated fatty oils which comprises mixing with such an oil the alkali-metal salt of an hydroxy-polybasic aliphatic acid.

3. The process of inhibiting oxidation or decomposition in the presence of air of an unsaturated organic material which has a tendency to undergo a chemical change at 20° C. when exposed to air and to actinic light, which comprises dispersing, at least throughout the surface portion of said material, an hydroxy-polybasic aliphatic acid compound whose molecule contains between one and four carboxyl groups, in at least one of which groups the hydrogen radical has not been replaced by other radicals.

4. The process of inhibiting oxidation or decomposition in the presence of air of an unsaturated fatty substance which has a tendency to undergo a chemical change at 20° C. when exposed to air and to actinic light, which comprises dispersing, at least throughout the surface portion of said substance, an hydroxy-polybasic aliphatic acid compound whose molecular structure is in part as follows:

$$(OH)_m R(CO.O-)_n$$

where R comprises at least one carbon atom, $m$ represents a whole number, and $n$ represents a whole number greater than one.

5. A composition of matter comprising a fatty material having a tendency to become rancid and an hydroxy-polybasic aliphatic acid compound capable of retarding development of rancidity in said fatty material.

6. A composition of matter comprising a fatty material having a tendency to become rancid and an alkali-metal salt of an hydroxy-polybasic aliphatic acid whose molecule contains between one and four carboxyl groups.

7. A composition of matter comprising a fatty material having a tendency to become rancid and a tartrate.

8. A composition of matter comprising a fatty material having a tendency to become rancid and an hydroxy-polybasic aliphatic acid compound whose molecular structure is in part as follows:

$$(OH)_m R(CO.O-)_n$$

where R comprises at least one carbon atom, $m$ represents a whole number, and $n$ represents a whole number greater than one.

9. A composition of matter comprising an unsaturated vegetable oil and an hydroxy-polybasic aliphatic acid compound capable of retarding development of rancidity in said oil.

10. A composition of matter comprising an unsaturated vegetable oil and a tartrate.

11. A composition of matter comprising an unsaturated vegetable oil and an hydroxy-polybasic acid compound whose molecular structure is in part as follows:

$$(OH)_m R(CO.O-)_n$$

where $m$ represents a whole number having a value of from one to four, R represents a polyvalent radical comprising at least as many carbon atoms as there are hydroxyl groups, and $n$ represents a whole number having a value of from two to four.

12. A coating composition comprising nitrocellulose, a vegetable oil, and an hydroxy-polybasic aliphatic acid compound capable of retarding development of rancidity in said oil.

13. A coating composition comprising nitrocellulose, a vegetable oil, and an hydroxy-dibasic aliphatic acid capable of retarding development of rancidity in said oil.

14. A coating composition comprising nitrocellulose, a vegetable oil, and from about 0.1% to 2.0%, based on the amount of oil present, of an hydroxy-polybasic aliphatic acid compound capable of retarding development of rancidity in said oil.

15. A coating composition comprising nitrocellulose, castor oil, and an hydroxy-polybasic aliphatic acid compound capable of retarding development of rancidity in said oil.

16. A coating composition comprising nitrocellulose, castor oil, and a tartrate.

17. A coating composition containing nitrocellulose, a softener for said nitrocellulose comprising a substance having a tendency to undergo oxidation when exposed to air, and an hydroxy-polybasic aliphatic acid compound capable of inhibiting said oxidation.

18. A coating composition containing nitrocellulose, a softener for said nitrocellulose comprising a substance having a tendency to undergo oxidation when exposed to air, and from about 0.1 to 2.0%, based upon the amount of said substance, of an hydroxy-polybasic aliphatic acid compound capable of inhibiting said oxidation.

19. A coating composition comprising, in solution in a volatile solvent, nitrocellulose, an unsaturated oil, and an hydroxy-polybasic aliphatic acid compound in an amount sufficient to practically prevent development of rancidity in said oil when the composition, in the form of a film, is exposed to air at room temperature.

20. A coating composition comprising, in solution in a volatile solvent, nitrocellulose, castor oil, and an hydroxy-polybasic aliphatic acid compound in an amount sufficient to practically prevent development of rancidity in said oil when the composition, in the form of a film, is exposed to air at room temperature.

In testimony whereof I affix my signature.
THOMAS HUNTON ROGERS.